United States Patent
Lee et al.

(10) Patent No.: US 10,474,804 B2
(45) Date of Patent: Nov. 12, 2019

(54) LOGIN MECHANISM FOR OPERATING SYSTEM

(71) Applicant: GOTrust Technology Inc., Taichung (TW)

(72) Inventors: Darren Tien-Chi Lee, Taichung (TW); Jeng Lung Li, Taichung (TW); Yi-Kai Wang, Taichung (TW); Jiacheng Xu, Fullerton, CA (US)

(73) Assignee: GOTRUSTID, INC., Dover, DE (US)

( * ) Notice: Subject to any disclaimer, the term of this patent is extended or adjusted under 35 U.S.C. 154(b) by 211 days.

(21) Appl. No.: 15/835,083

(22) Filed: Dec. 7, 2017

(65) Prior Publication Data

US 2018/0165436 A1    Jun. 14, 2018

(30) Foreign Application Priority Data

Dec. 8, 2016 (TW) .............................. 105140693 A

(51) Int. Cl.
| | |
|---|---|
| G06F 21/32 | (2013.01) |
| H04L 9/32 | (2006.01) |
| G06F 21/46 | (2013.01) |
| G06F 9/4401 | (2018.01) |

(52) U.S. Cl.
CPC ............ G06F 21/32 (2013.01); G06F 9/4406 (2013.01); G06F 21/46 (2013.01); H04L 9/3226 (2013.01)

(58) Field of Classification Search
CPC .............. G06F 21/32; H04L 9/32; H04L 9/31
See application file for complete search history.

(56) References Cited

U.S. PATENT DOCUMENTS

| | | | | |
|---|---|---|---|---|
| 2001/0025342 | A1* | 9/2001 | Uchida | H04L 9/3231 713/186 |
| 2004/0128519 | A1* | 7/2004 | Klinger | G06F 21/32 713/186 |
| 2007/0003061 | A1* | 1/2007 | Jung | H04L 63/061 380/270 |
| 2007/0079136 | A1* | 4/2007 | Vishik | G06Q 20/0855 713/186 |
| 2007/0094509 | A1* | 4/2007 | Wei | G06F 21/42 713/176 |
| 2007/0106903 | A1* | 5/2007 | Scheidt | G06K 9/00006 713/182 |

(Continued)

Primary Examiner — Ponnoreay Pich
(74) Attorney, Agent, or Firm — Muncy, Geissler, Olds & Lowe, P.C.

(57) ABSTRACT

A login mechanism for an operating system, including: a computer device, loaded with a computer operating system; and a mobile device, capable of sending a login password for the computer operating system, and capable of authenticating a human biometric feature. In the login mechanism of the present invention, the login password for the computer operating system is stored on the mobile device. When a user logs in to the computer operating system, the mobile device authenticates a biometric feature. After authentication succeeds, the mobile device transfers the login password to the computer device, so as to log in to the computer operating system. A user does not need to enter a login password, and two-factor authentication including login password authentication and biometric feature authentication is used to protect the security of login to the computer operating system.

19 Claims, 15 Drawing Sheets

(56) References Cited

U.S. PATENT DOCUMENTS

| | | | |
|---|---|---|---|
| 2015/0067775 A1* | 3/2015 | Cardone | H04L 63/0884 726/3 |
| 2016/0157100 A1* | 6/2016 | Soderblom | H04L 9/3226 455/411 |
| 2016/0248769 A1* | 8/2016 | Han | G06F 21/32 |
| 2018/0165436 A1* | 6/2018 | Lee | H04L 9/3231 |

* cited by examiner

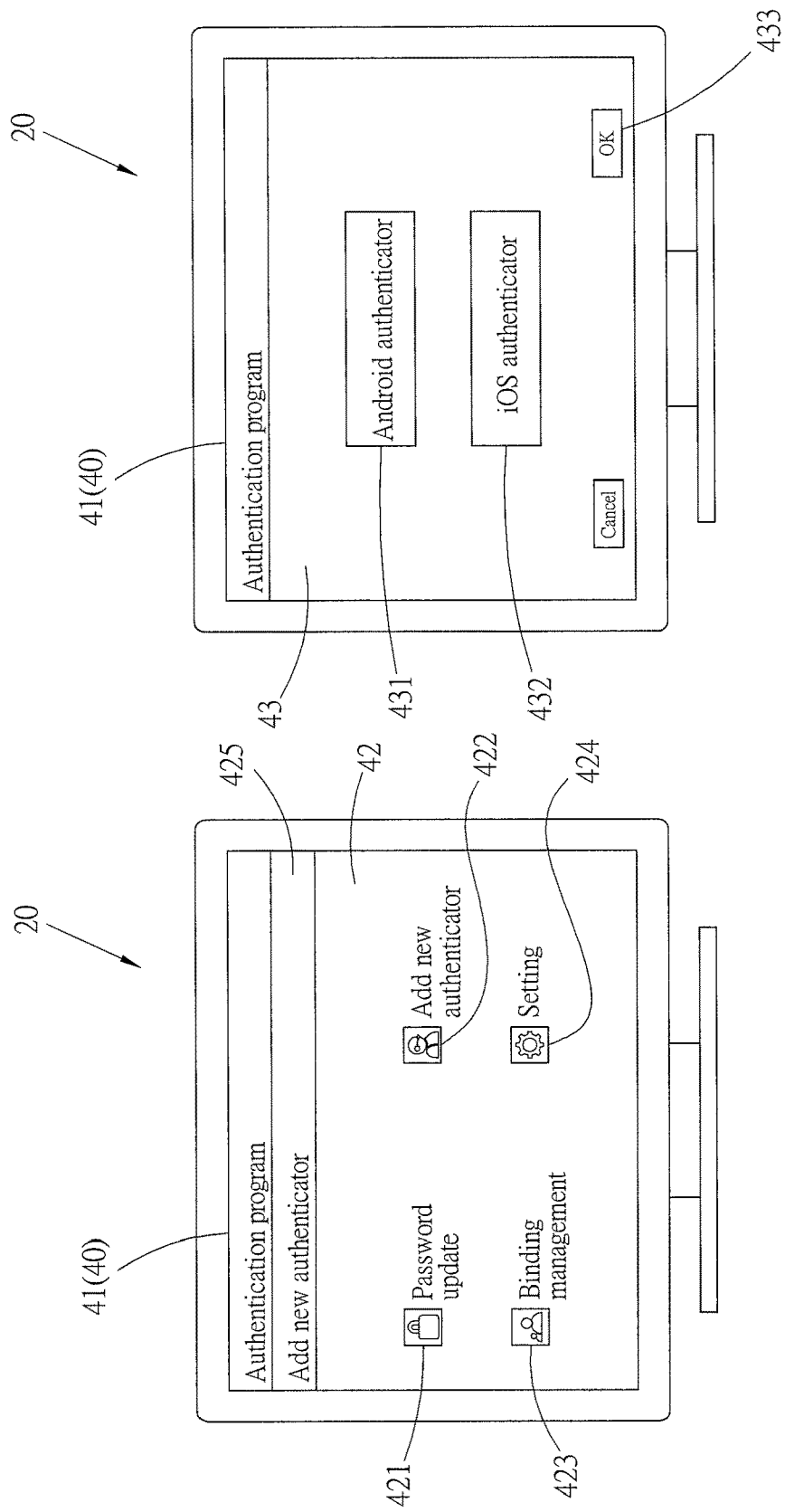

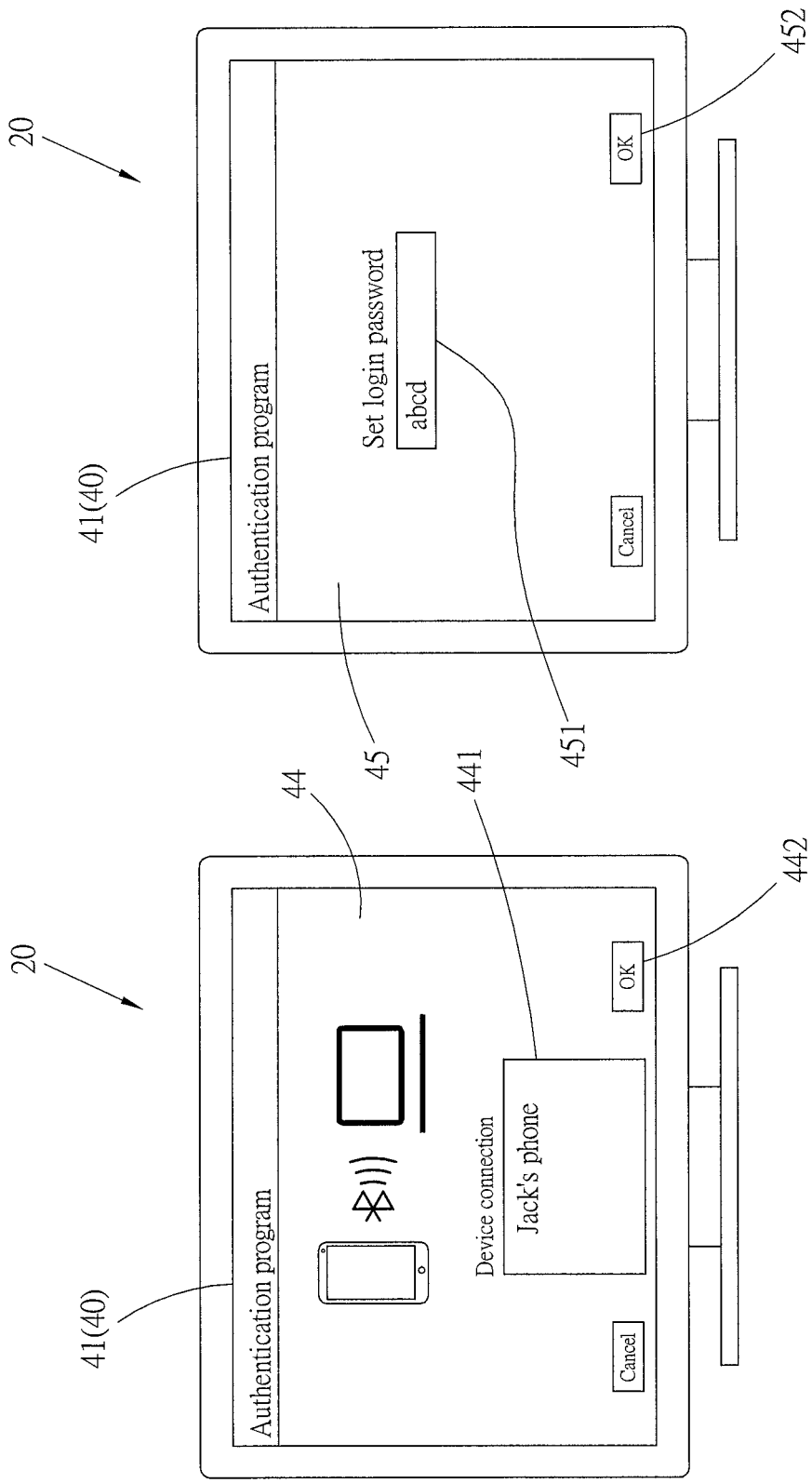

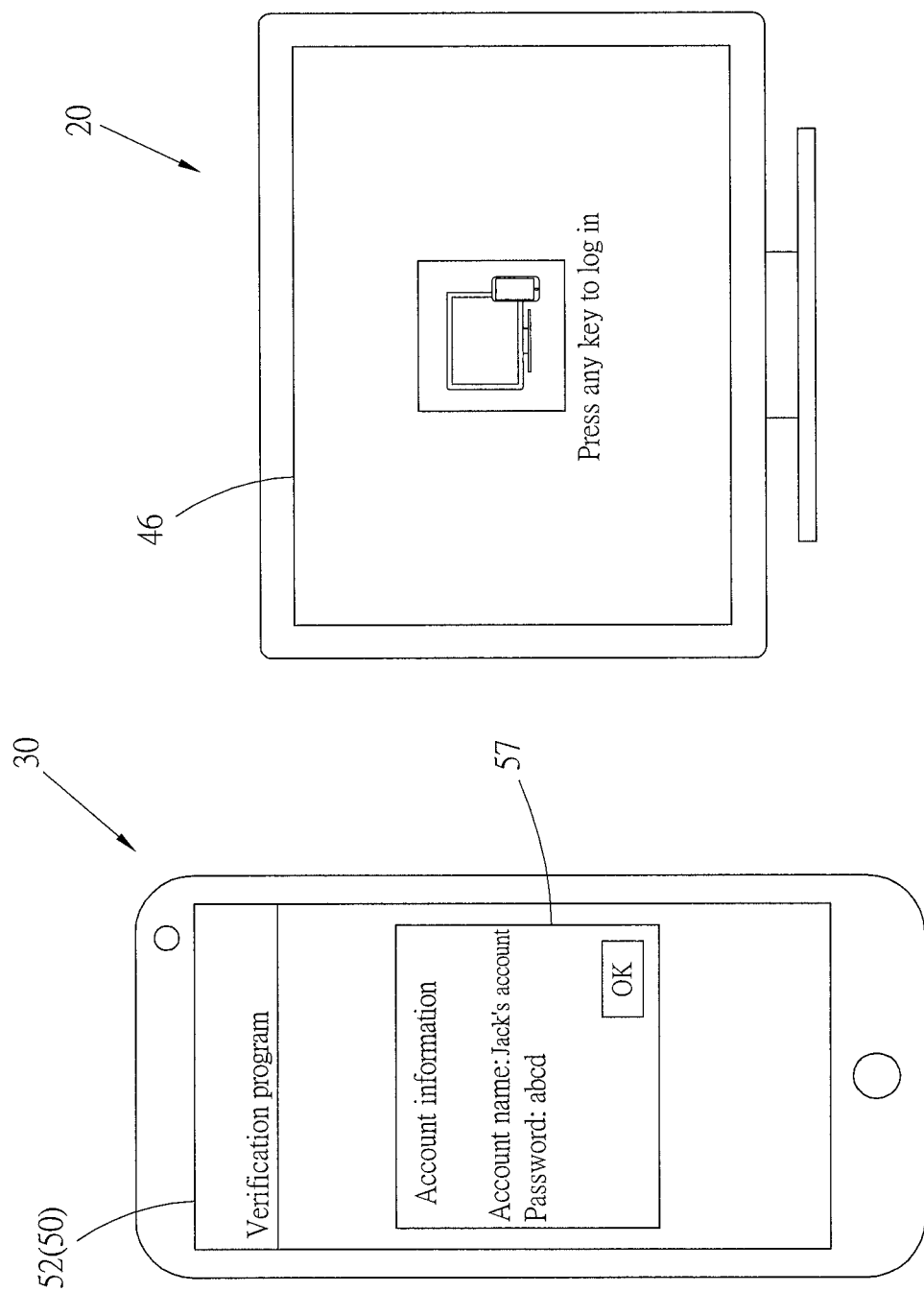

LOGIN MECHANISM FOR OPERATING SYSTEM

BACKGROUND OF THE INVENTION

1. Field of the Invention

The present invention relates to a login mechanism, and in particular, to a login mechanism for an operating system.

2. Description of the Related Art

In the current era of rapid development of science and technology, computers (for example, desktop computers or notebook computers) already become one of the essential electronic products in companies, schools, shopping malls or families. Highly private personal data or confidential information may be stored in a computer. Therefore, an existing computer provides a login mechanism using password authentication. A user needs to enter a correct login password to log in to a computer and perform an operation, so as to maintain the information security of the computer.

Nowadays, phishing programs and computer viruses are highly rampant. Once a user is incautious, a backdoor program (for example, a Trojan horse) is planted in a computer very easily. As a result, a login password for the computer is logged and stolen by a malicious person such as a hacker. Personal data or confidential information stored on the computer further leaks consequently, or even the control right of the computer is acquired by the malicious person. As can be seen, nowadays, a login mechanism using a password to authenticate a user can no longer provide a computer with sufficient security.

In view of this, many companies and enterprises require an employee to change a login password periodically, and a changed login password cannot be the same as a previous login password, so as to prevent login by a malicious person, thereby improving the strength of information security of the computer. However, when logins are frequently changed, it is difficult for an employee to memorize a login password for a computer. Often, an employee repeatedly enters incorrect login passwords to lock a computer, and an information security department of a company needs to engage to unlock and allocate a new login password, causing unnecessary trouble for the information security department. Moreover, a fairly old or lazy employee may even write down a login password on a piece of paper for convenient login. As a result, a login password leaks easily, the information security of the employee's computer is severely jeopardized, and a mechanism of authenticating user identity by using a login password is practically neutralized. Further, it becomes meaningless to use a login password to authenticate user identity to ensure the information security of a computer.

In view of the above, many companies and enterprises allocate unique login credentials generally in a card form to each employee. When an employee logs in to a computer, the computer needs to authenticate the login credentials to ensure that the employee is a valid user of the computer. However, in such a login mode, an additional authentication system needs to be established, and additional costs are needed to make login credentials of the employees. Considerable time and expense are needed for subsequent maintenance and update of the authentication system and login credentials. This login authentication mode is hardly desirable for companies or enterprises.

SUMMARY OF THE INVENTION

An object of the present invention is to provide a login mechanism for an operating system, so as to improve the convenience and security of logging into a computer operating system.

Another object of the present invention is to provide a login mechanism for an operating system, so as to perform login by using a mobile device.

Still another object of the present invention is to provide a login mechanism for an operating system, so as to automatically generate a new login password for a computer operating system.

A login mechanism for an operating system provided in the present invention includes:
- a computer device, including a processing unit and a transmission unit, the computer device being loaded with a computer operating system; and
- a mobile device, including: an operation unit, an information transmission unit, and a sampling unit, the information transmission unit being capable of transmitting a login password, and the sampling unit verifying a human biometric feature, where
- when login needs to be performed to the computer operating system, the sampling unit of the mobile device verifies a biometric feature of a user, and after verification succeeds, the information transmission unit transmits the login password to the transmission unit of the computer device, so as to log in to the computer operating system.

Preferably, the mobile device further includes a password generation application. The password generation application is capable of generating a new password. The new password is used to update an authentication password on the mobile device and is capable of being transmitted to the computer device, to update a verification password on the computer device.

Therefore, in the present invention, a mobile device stores a login password for a computer operating system. Before operating a computer device, a user needs to first pass biometric feature authentication of the mobile device. After the biometric feature authentication succeeds, the mobile device transfers a password to the computer device, to enable the user to enter the computer operating system of the computer device for the user perform an operation. In this way, a user does not need to choose a password to enter, so as to avoid an embarrassing situation in which the user forgets a password and consequently cannot enter the computer operating system of the computer device to operate the computer device, and the user only needs to pass the biometric feature authentication of the mobile device to log in to the computer operating system, so that the convenience of login by the user is improved. Next, in the login mechanism of the present invention, two-factor authentication including login password authentication and biometric feature authentication is used to protect the security of a user account. In the login mechanism, both the mobile device that stores a login password and a user that can pass biometric feature authentication are required to log in to the computer operating system, so that the security of an account is greatly improved. Moreover, the login mechanism of the present invent ion may adapt to an existing login mechanism for a computer operating system, and in the login mechanism, an authentication system does not need to be additionally established or login credentials do not need to be additionally made. In this way, information security costs of companies or enterprises can be reduced, and the management convenience of information security departments is improved. Furthermore, the mobile device of the present invention may automatically generate a new login password, and the new login password may be directly written over a login password in the computer operating system of the computer device. In this way, not only information security requirements of information security departments of companies or enterprises can be satisfied, but also leakage of information that occurs because an original password is stolen by a malicious person such as a hacker can be avoided, thereby improving the security strength of information.

BRIEF DESCRIPTION OF THE DRAWINGS

In order to better understand the objects, features, and effects of the present invention, a preferred embodiment of the present invention is described below in detail with reference to the accompanying drawings.
Where:

FIG. 6 is a schematic diagram of a computer device displaying a function selection page according to the present invention.

FIG. 7 is a schematic diagram of the computer device displaying an authenticator type page according to the present invention.

FIG. 8 is a schematic diagram of the computer device displaying a device connection page according to the present invention.

FIG. 9 is a schematic diagram of the computer device displaying a password setting page according to the present invention.

FIG. 13 is a schematic diagram of the mobile device displaying account information according to the present invention.

FIG. 14 is a schematic diagram of the computer device displaying a start page according to the present invention.

DETAILED DESCRIPTION OF THE PREFERRED EMBODIMENTS

Figure 1:
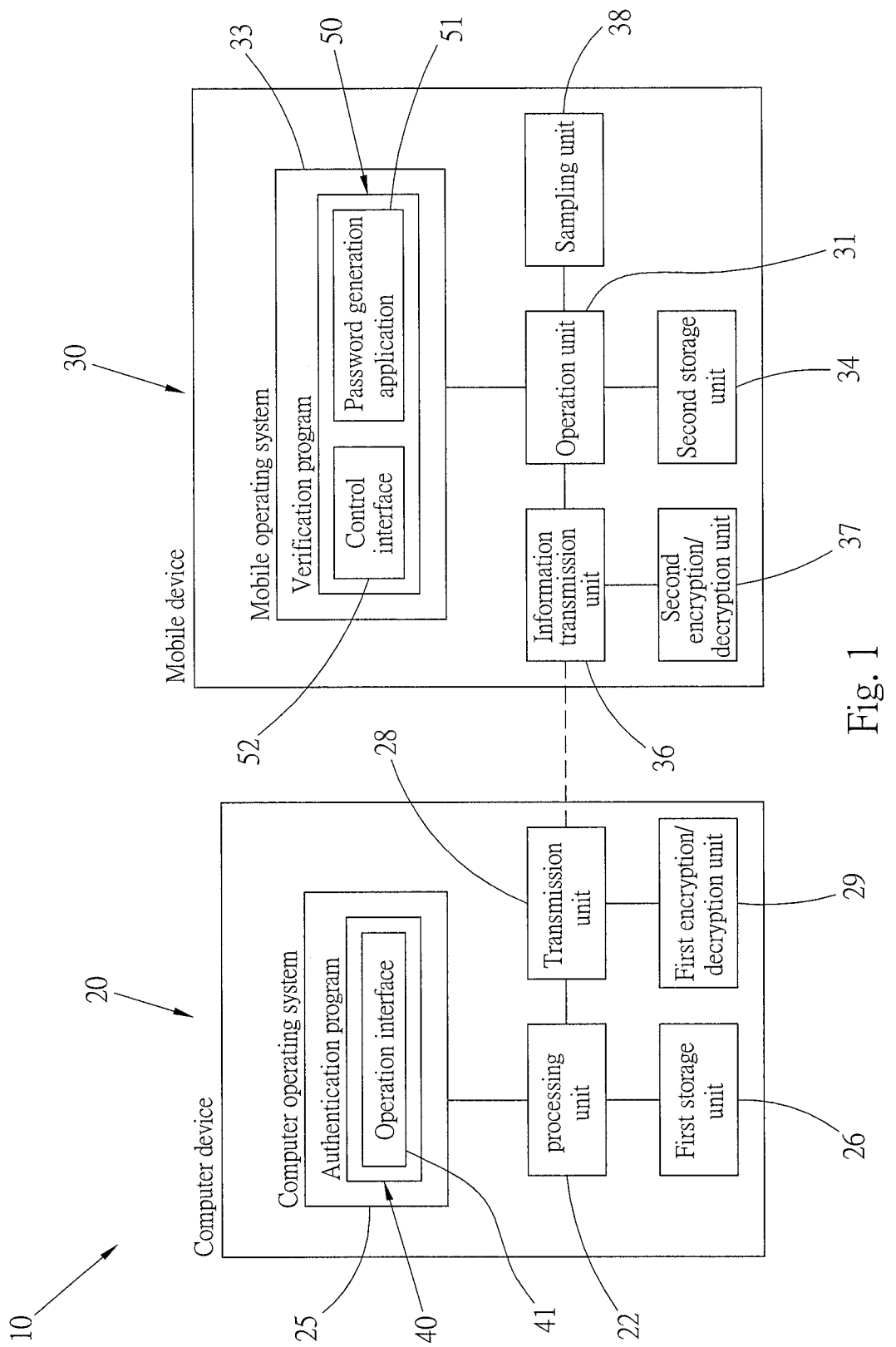
FIG. 1 is an architectural diagram of a login mechanism according to a preferred embodiment of the present invention.

Referring to FIG. 1, FIG. 1 shows a preferred embodiment of a login mechanism 10 for an operating system provided in the present invention. The login mechanism 10 includes a computer device 20 and a mobile device 30.

Figure 10:
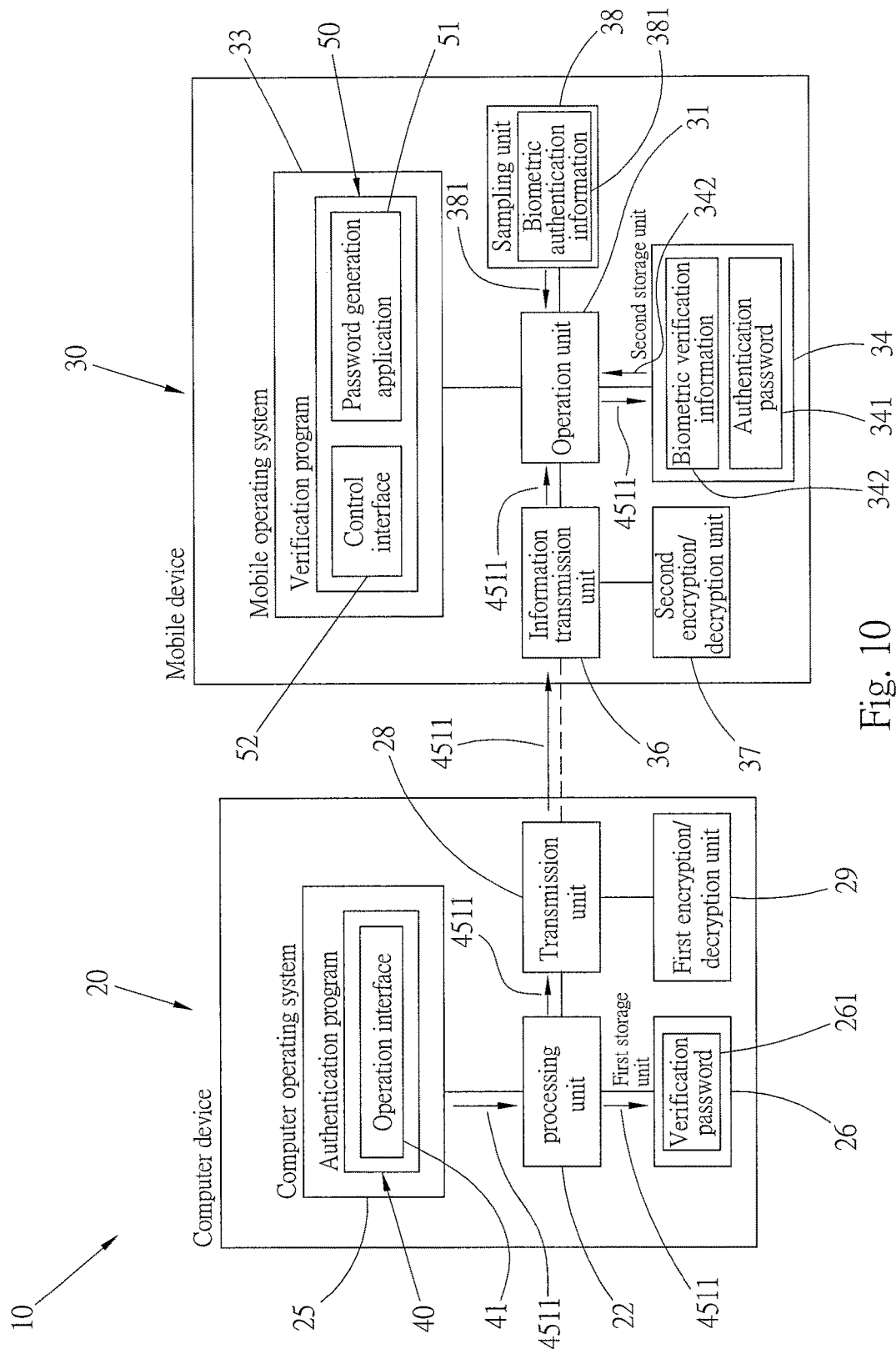
FIG. 10 is a schematic diagram of generating a verification password and an authentication password and authenticating a biometric feature in the login mechanism of the present invention.

The computer device 20 in this embodiment may be, but is not limited to, a desktop computer or a notebook computer, is loaded with a computer operating system 25, and includes a processing unit 22, a first storage unit 26, a transmission unit 28, and a first encryption/decryption unit 29. The first storage unit 26 and the transmission unit 28 are electrically connected to the processing unit 22. The first encryption/decryption unit 29 is electrically connected to the transmission unit 28. The computer operating system 25 may be, but is not limited to, a Microsoft Windows operating system provided by Microsoft Corporation, or a mac OS operating system provided by Apple Inc., and is a Microsoft Windows operating system in this embodiment. At least one user account may be created on the computer operating system 25. Login is performed to the user account by using a password. An authentication program 40 is installed on the computer operating system 25. The authentication program 40 provides an operation interface 41. The operation interface 41 is displayed on a screen of the computer device 20, so that a user operates the authentication program 40. The processing unit 22 is the operation core of the computer device 20, and may execute the computer operating system 25. The first storage unit 26 stores a verification password 261, as shown in FIG. 10. The transmission unit 28 in this embodiment is a Bluetooth module, and may transmit information to the mobile device 30. The first encryption/decryption unit 29 encrypts and decrypts information transmitted and received by the transmission unit 28.

It should be noted that, the computer operating system 25 and the verification password 261 may be stored in a same storage medium or different storage media.

The mobile device 30 may be a smartphone or a tablet in this embodiment, is loaded with a mobile operating system 33, and includes an operation unit 31, a second storage unit 34, an information transmission unit 36, a second encryption/decryption unit 37, and a sampling unit 38. The second storage unit 34, the information transmission unit 36, and the sampling unit 38 maybe electrically connected to the operation unit 31. The second encryption/decryption unit 37 is electrically connected to the information transmission unit 36. The mobile operating system 33 may be, but is not limited to, an Android operating system provided by Google Inc., or an iOS operating system provided by Apple Inc., and is an Android operating system in this embodiment. A verification program 50 is installed on the mobile operating system 33. The verification program 50 has a password generation application 51 and a control interface 52. The control interface 52 is displayed on a screen of the mobile device 30, so that the user controls the verification program 50. The operation unit 31 is the operation core of the mobile device 30, and may execute the mobile operating system 33. The second storage unit 34 stores an authentication password 341 and biometric verification information 342, as shown in FIG. 10. The information transmission unit 36 in this embodiment is a Bluetooth module, and information may be transmitted between the information transmission unit 36 and the transmission unit 28 of the computer device 20. The second encryption/decryption unit 37 may encrypt and decrypt information transmitted and received by the information transmission unit 36. The sampling unit 38 may sample a human biometric feature, may be, for example, a facial recognition module or a fingerprint collection module, and may sample the face or a fingerprint of the user, and generate biometric authentication information 381, as shown in FIG. 10.

It should be noted that, the mobile operating system 33, the authentication password 341, and the biometric verification information 342 may be stored in a same storage medium or different storage media.

Figure 3:
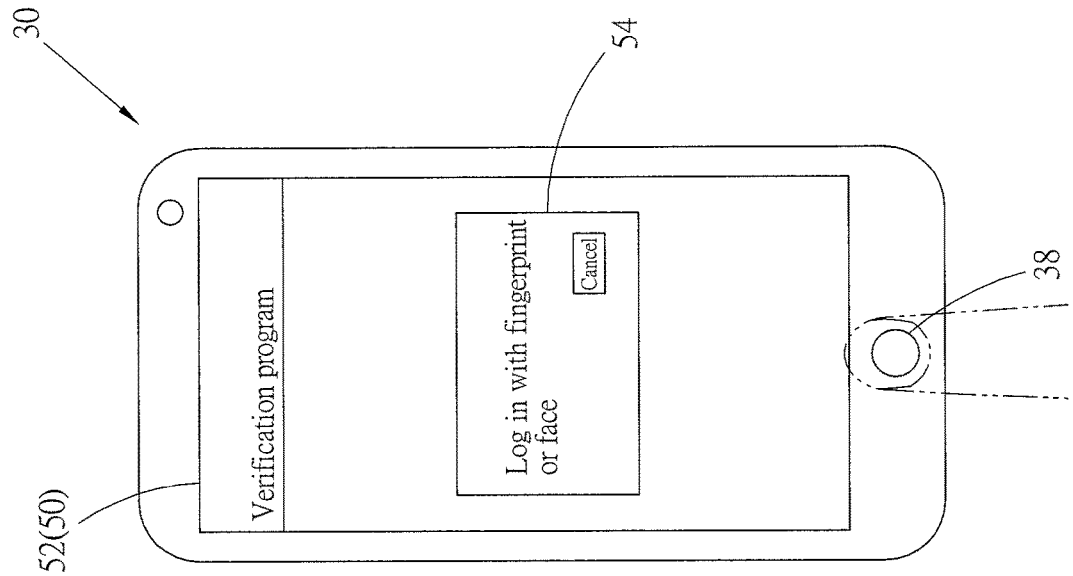
FIG. 3 is a schematic diagram of the mobile device displaying a biometric feature login prompt according to the present invention.
Figure 2:
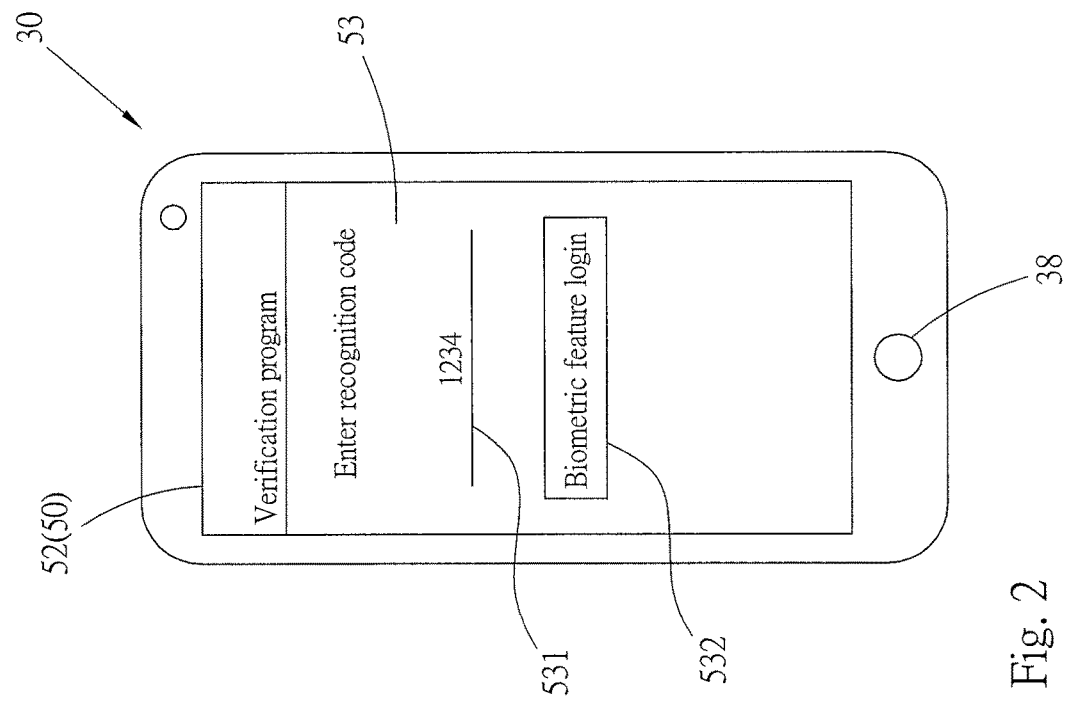
FIG. 2 is a schematic diagram of a mobile device displaying a recognition code setting page according to the present invention.
Figure 5:
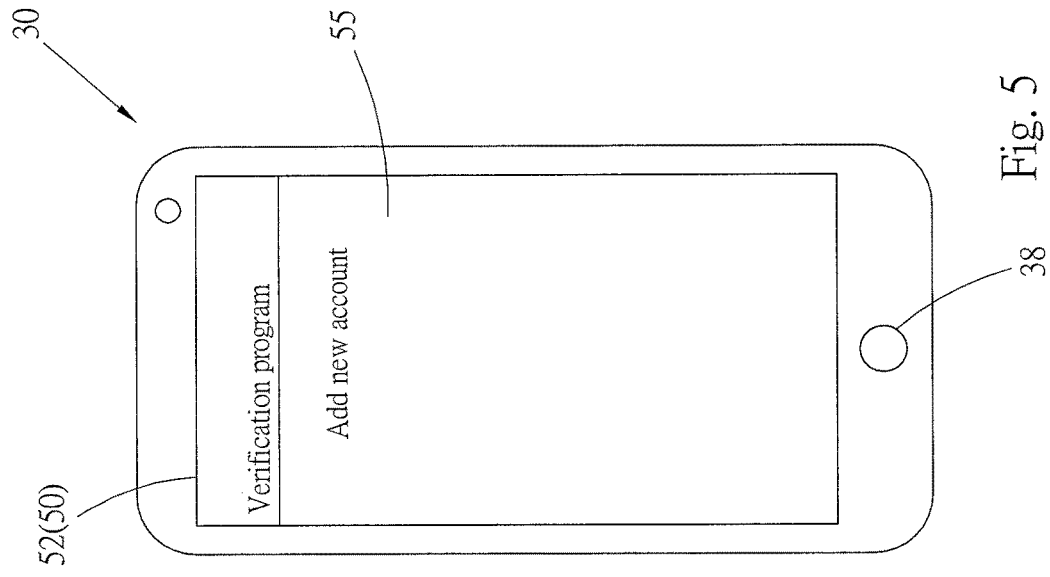
FIG. 5 is a schematic diagram of the mobile device displaying an account list page according to the present invention.
Figure 4:
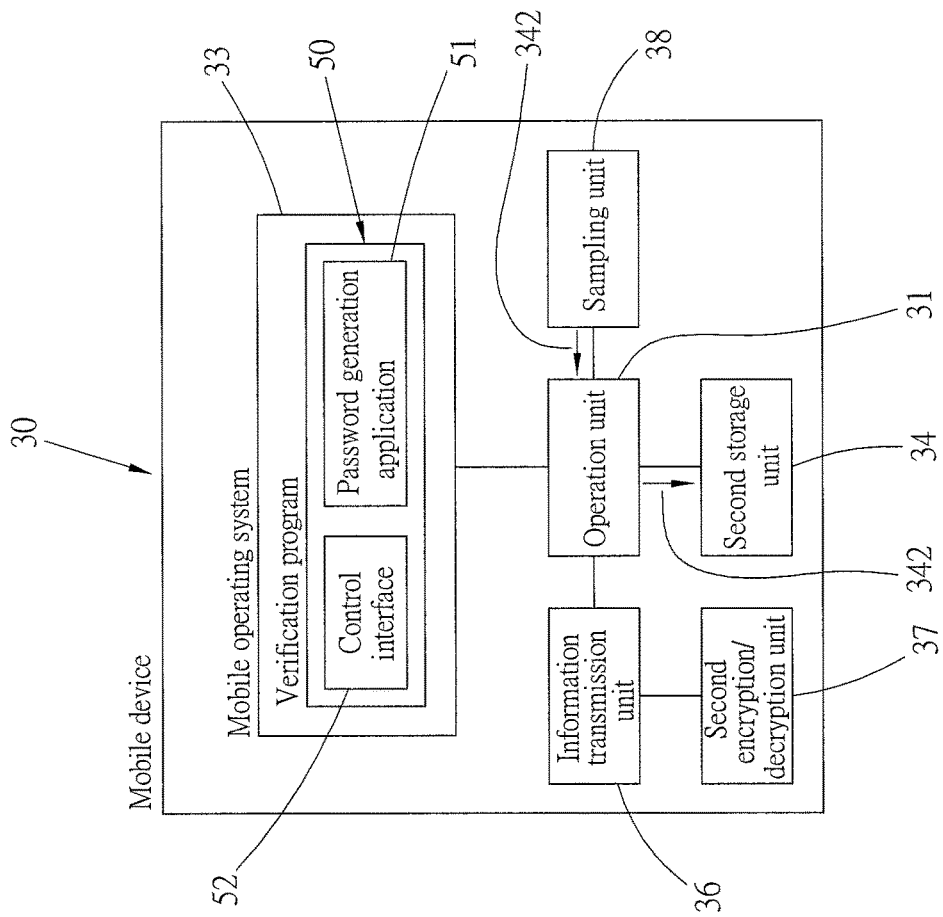
FIG. 4 is an operation diagram of the mobile device generating biometric verification information according to the present invention.

A use manner in the present invention is described below. Before the user logs into the computer operating system 25 of the computer device 20 for the first time by using the mobile device 30, the mobile device 30 and the user account in the computer operating system 25 are bound in advance. Referring to FIG. 2, when the user uses the verification program 50 on the mobile device 30 for the first time, the control interface 52 displayed on the screen of the mobile device 30 presents a recognition code setting page 53. The recognition code setting page 53 has a recognition code entry area 531 for the user to set a recognition code (1234 is used as an example here). After entry is completed, a biometric feature login button 532 is pressed. Referring to FIG. 3, a biometric feature login prompt 54 pops up on the control interface 52. The user may perform login by using the user's fingerprint or face. Here, fingerprint login is used as an example. The user provides a fingerprint to be sampled by the sampling unit 38 of the mobile device 30. In this case, referring to FIG. 4, the sampling unit 38 generates the biometric verification information 342, and stores the biometric verification information 342 in the second storage unit 34. Referring to FIG. 5, after biometric feature login of the user is completed, the control interface 52 displays an account list page 55. Subsequently, the information transmission unit 36 of the mobile device 30 is paired with the transmission unit 28 of the computer device 20, to enable the information transmission unit 36 and the transmission unit 28 to be connected to transmit information.

Figure 11:
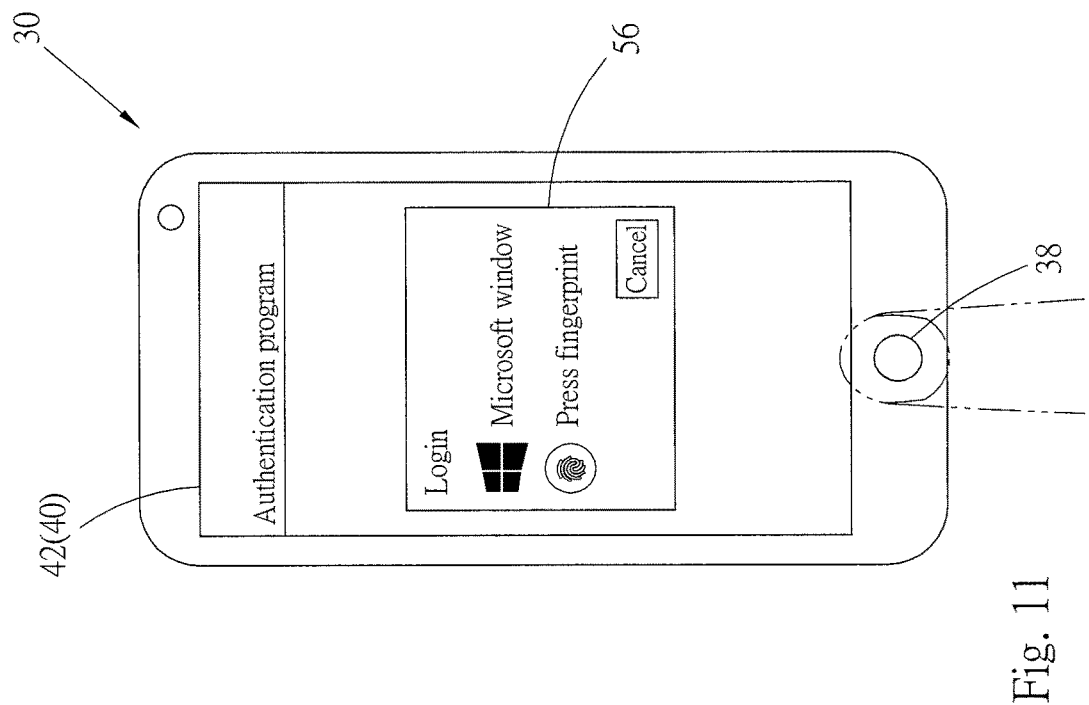
FIG. 11 is a schematic diagram of the mobile device displaying an identity verification prompt according to the present invention.

Referring to FIG. 6, after the foregoing setting is completed, the user starts the authentication program 40 on the computer device 20. The operation interface 41 displayed by the computer device 20 presents a function selection page 42. The function selection page 42 includes a password update button 421, an "Add new authenticator" button 422, a binding management button 423, a setting button 424, and an authenticator list area 425. The addition of a new authenticator is first described here. Referring to FIG. 7, after the user presses the "Add new authenticator" button 422, the operation interface 41 displays an authenticator type page 43. The authenticator type page 43 includes an Android authenticator key 431 and an iOS authenticator key 432. The user performs selection according to the type of the mobile operating system of the mobile device 30. The mobile operating system 33 of the mobile device 30 in this embodiment is an Android operating system. Therefore, a tap on the Android authenticator key 431 is used as an example here, so that information subsequently transmitted by the computer device 20 may adapt to the Android operating system. After selection is completed, an OK button 433 is pressed. Referring to FIG. 8, a device connection page 44 is displayed on the operation interface 41. The device connection page 44 has a device list box 441. Mobile devices that are paired with the computer device 20 and that can be connected are listed in the device list box 441. In this case, the user taps a device name (for example, Jack's phone) of the mobile device 30 and taps an OK button 442. Referring to FIG. 9, after the computer device 20 is connected to the mobile device 30, the operation interface 41 displayed by the screen of the computer device 20 presents a password setting page 45. The password setting page 45 has a password setting box 451. The user sets a login password 4511 (abcd is used as an example here) for the user account in the computer operating system 25 on the password setting box 451. After completing setting, the user taps an OK button 452. In this case, referring to FIG. 10 and FIG. 11, the authentication program 40 on the computer device 20 transfers the login password 4511 to the first storage unit 26 to form the verification password 261, and also transfers the login password 4511 to the information transmission unit 36 of the mobile device 30 by using the transmission unit 28. After the information transmission unit 36 of the mobile device 30 receives the login password 4511, the control interface 52 of the verification program 50 displays an identity verification prompt 56. In this case, the user presses a fingerprint on the sampling unit 38 of the mobile device 30, so that the sampling unit 38 generates the biometric authentication information 381. The operation unit 31 compares the biometric authentication information 381 in the sampling unit 38 with the biometric verification information 342 in the second storage unit 34, and when the biometric authentication information 381 is consistent with the biometric verification information 342, transfers the password received by the information transmission unit 36 to the second storage unit 34 to form the authentication password 341.

Figure 12:
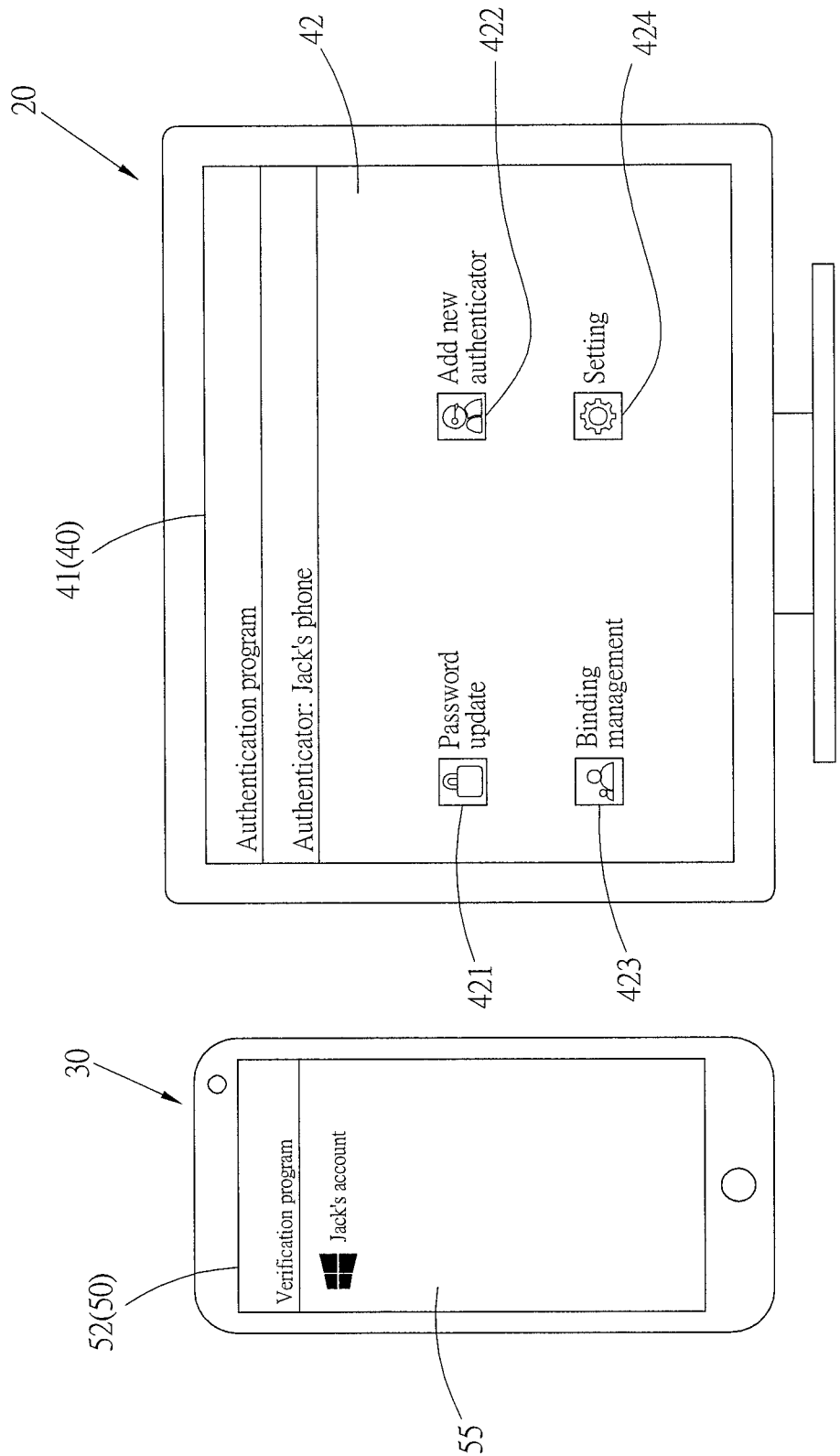
FIG. 12 is a schematic diagram of the computer device and the mobile device respectively displaying the function selection page and the account list page according to the present invention.

Referring to FIG. 12, after the mobile device 30 stores the authentication password 341, the operation interface 41 on the computer device 20 presents the function selection page 42 in response. The authenticator list area 425 on the function selection page 42 displays the device name (Jack's phone) of the mobile device 30, representing that the user account in the computer operating system 25 is bound to the mobile device 30. The control interface 52 on the mobile device 30 also displays the account list page 55 in response. The account list page 55 displays the user account (Jack's account) in the computer operating system 25 of the computer device 20. The user may also further tap the user account, to display account information 57 of the user account, as shown in FIG. 13.

Figure 15:
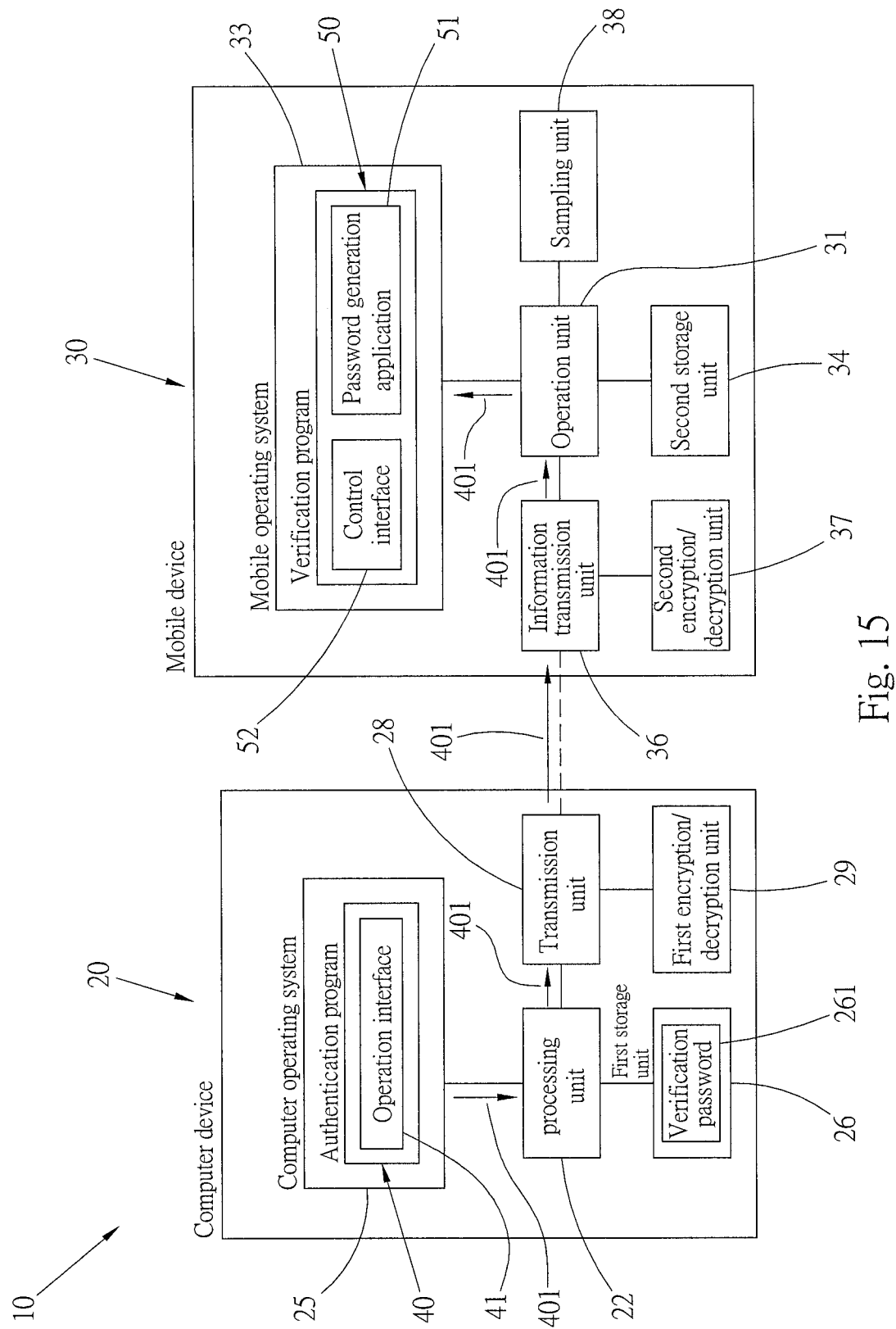
FIG. 15 is an operation diagram of the computer device transferring an authentication request to the mobile device according to the present invention.
Figure 16:
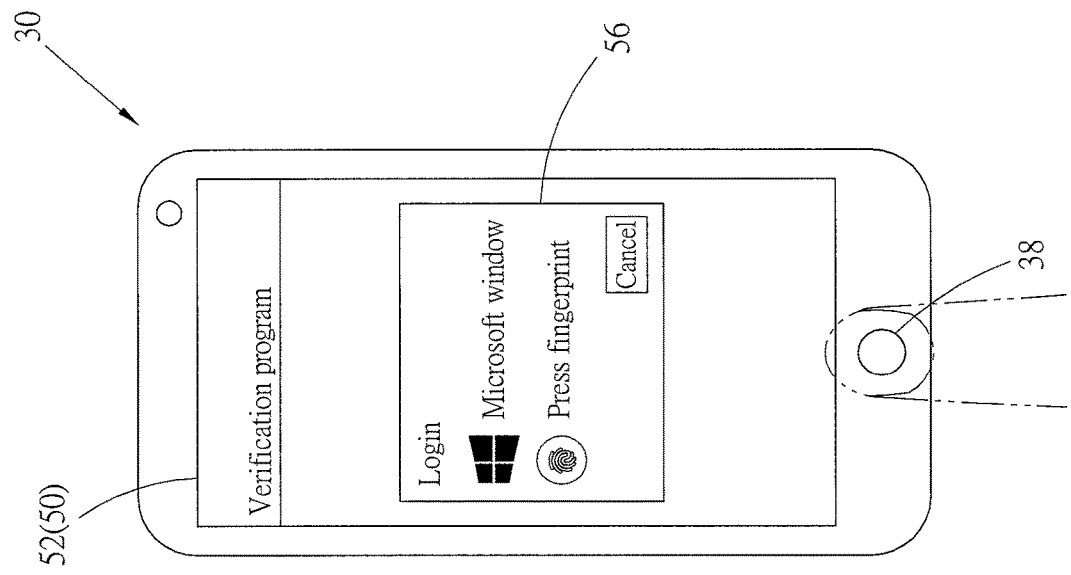
FIG. 16 is a schematic diagram of the mobile device displaying the identity verification prompt according to the present invention.
Figure 17:
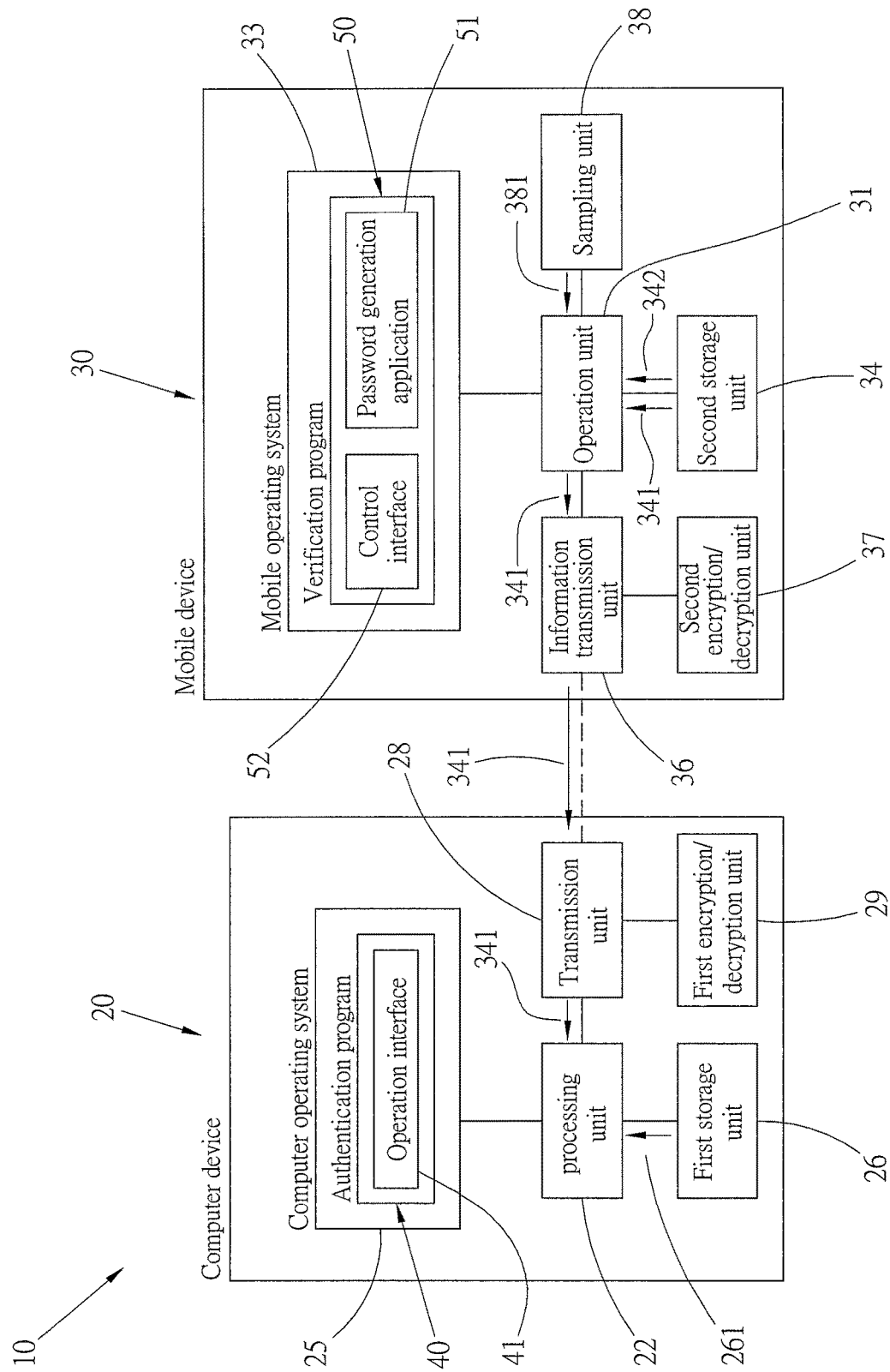
FIG. 17 is an operation diagram of the mobile device authenticating a biometric feature and transferring the authentication pas sword to the computer device to perform password authentication according to the present invention.

After the mobile device 30 and the user account in the computer operating system 25 of the computer device are bound, the mobile device 30 becomes a login authenticator for the computer operating system 25. The user may log in to the user account on the computer device 20 by using the mobile device 30. Referring to FIG. 14 and FIG. 15, the computer device 20 is turned on or restarted, so that when login needs to be performed to the computer operating system 25, the processing unit 22 starts the authentication program 40. A start page 46 is displayed on the screen of the computer device 20. In this case, the user presses any key on a keyboard of the computer device 20, so that the authentication program transfers an authentication request 401 to the verification program 50 on the mobile device 30 by using the transmission unit 28 of the computer device 20 and the information transmission unit 36 of the mobile device 30. Referring to FIG. 16 and FIG. 17, after the information transmission unit 36 of the mobile device 30 receives the authentication request 401, the identity verification prompt 56 pops up on the control interface 52 of the verification program 50, to request the user to perform identity authentication. The user presses a fingerprint on the sampling unit 38 of the mobile device 30. The sampling unit 38 samples the fingerprint and generates the biometric authentication information 381. The operation unit 31 then compares the biometric authentication information 381 generated by the sampling unit 38 with the biometric verification information 342 stored in the second storage unit 34. When the biometric authentication information 381 is consistent with the biometric verification information 342, the verification program 50 enables the information transmission unit 36 to transmit the authentication password 341 to the transmission unit 28 of the computer device 20.

After the transmission unit 28 of the computer device receives the authentication password 341, the authentication program 40 on the computer device 20 enables the processing unit 22 to compare the authentication password 341 with the verification password 261 in the first storage unit 26. When the authentication password 341 is consistent with the verification password 261, login may be performed to the user account in the computer operating system 25, so that the processing unit 22 executes the computer operating system 25.

Therefore, in the login mechanism of the present invention, a login password for a user account in a computer operating system of a computer device is stored in advance in a mobile device. When wanting to log in to the user account, a user first passes identity authentication of the mobile device. The mobile device then transmits the login password to the computer device and login may be performed to the user account. In this way, the user does not need to remember a login password and may log in by simply passing biometric feature verification of the mobile device, thereby significantly improving the convenience of logging in to the user account on the computer device.

It should be noted that after the mobile device 30 and the computer device 20 are bound, the user may perform binding management between the mobile device 30 and the computer device 20 by using the binding management button 423 on the function selection page 42 of the authentication program 40 on the computer device 20, or may set various parameters of the authentication program 40 by using the setting button 424 on the function selection page 42.

Figure 18:
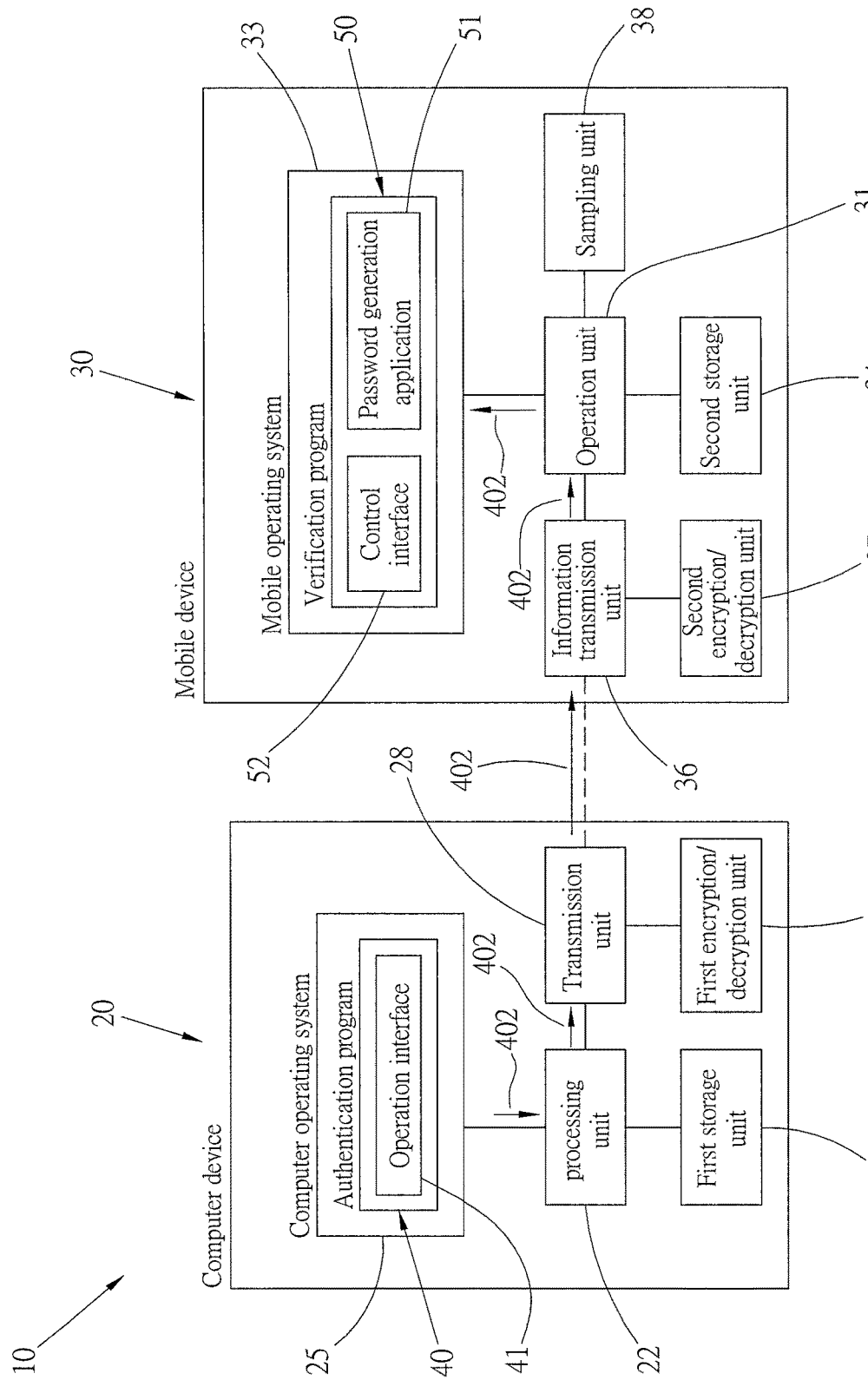
FIG. 18 is an operation diagram of the computer device transferring a password generation request to the mobile device according to the present invention.
Figure 19:
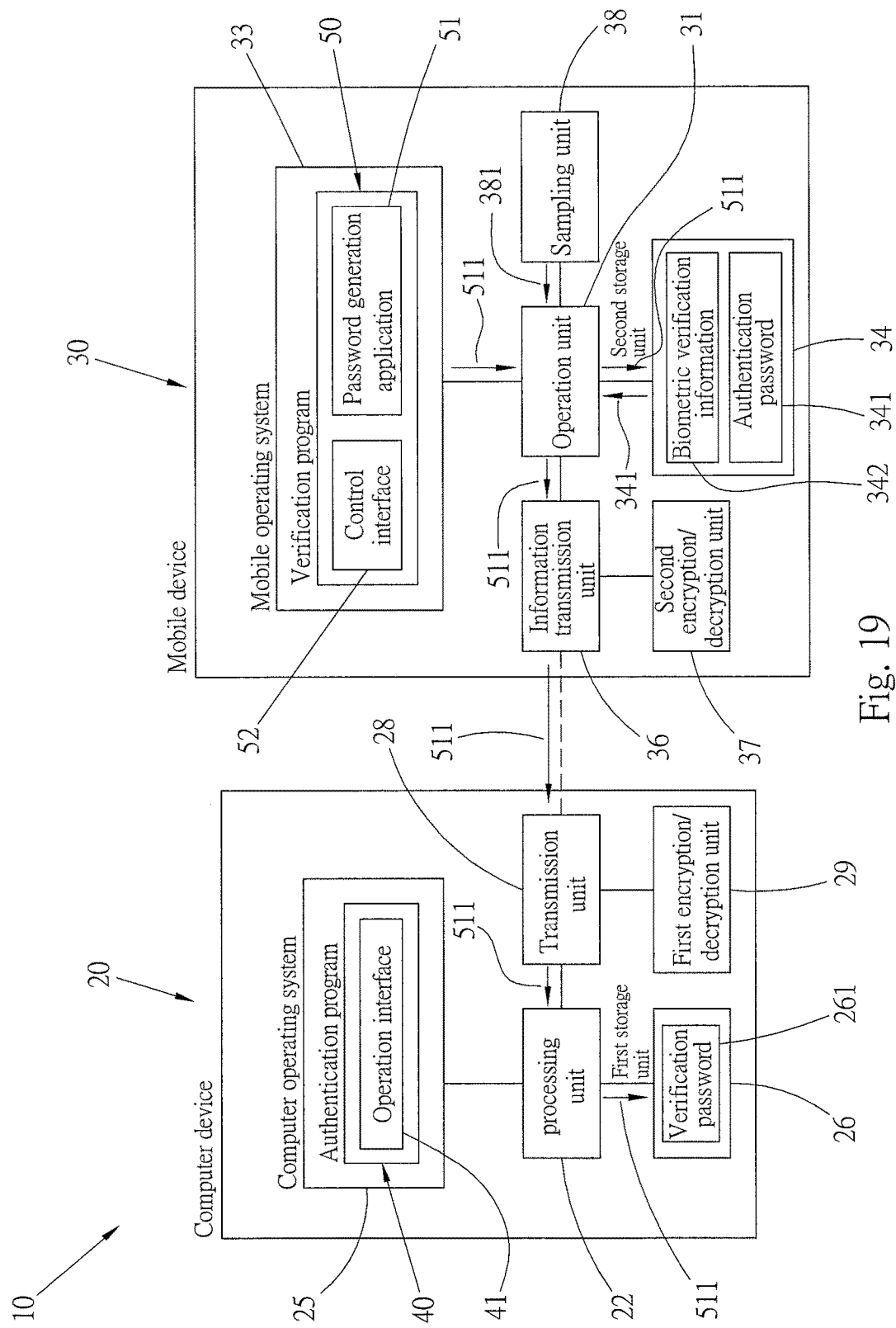
FIG. 19 is an operation diagram of the mobile device authenticating a biometric feature and transferring a new login password to the computer device according to the present invention.
Figure 20:
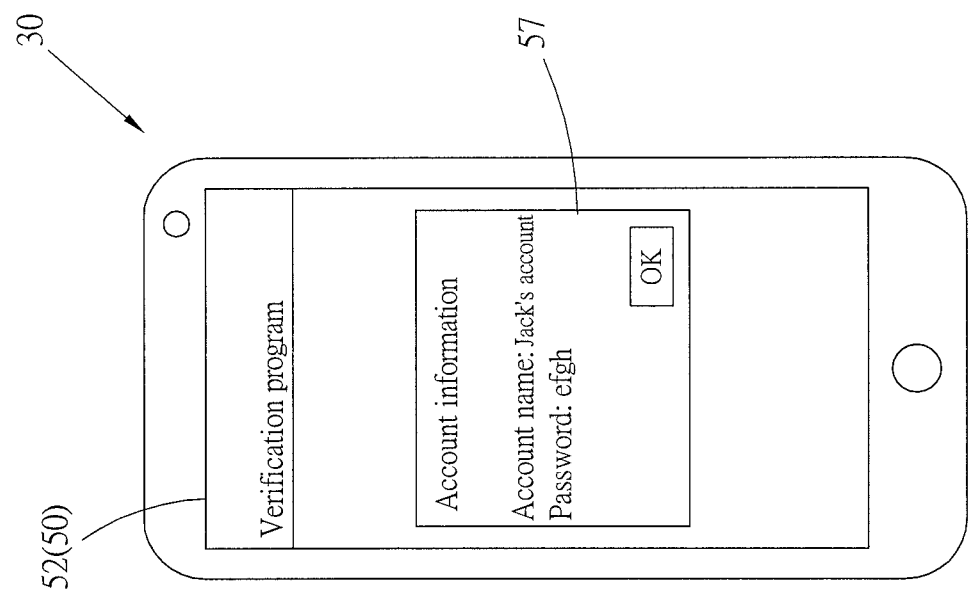
FIG. 20 is a schematic diagram of the mobile device displaying the account information after update according to the present invention.

When the user wants to update a password of the user's user account, referring to FIG. 12 and FIG. 18, the user taps the password update button 421 on the function selection page 42 on the operation interface 41 on the computer device 20. The authentication program 40 on the computer device 20 transfers a password generation request 402 to the verification program 50 on the mobile device 30 by using the transmission unit 28 and the information transmission unit 36 of the mobile device 30. Referring to FIG. 16 and FIG. 19, after the verification program 50 on the mobile device 30 receives the password generation request 402, the identity verification prompt 56 pops up on the control interface 52 of the verification program 50. The user provides a biometric feature such as a fingerprint or face to be sampled by the sampling unit 38. The operation unit 31 then compares the biometric authentication information 381 generated by the sampling unit 38 with the biometric verification information 342 in the second storage unit 34. When the biometric authentication information 381 is consistent with the biometric verification information 342, the verification program 50 starts the password generation application 51. The password generation application 51 generates a new password. The new password is a new login password 511 for the user account in the computer operating system 25. The new login password 511 is written over the authentication password 341 in the second storage unit of the mobile device 30, so as to update the authentication password 341. The new login password 511 may alternatively be written over the verification password 261 in the first storage unit 26 of the computer device 20 by using the information transmission unit 36 of the mobile device 30 and the transmission unit 28 of the computer device 20, so as to update the verification password 261. After updating a login password, the user may confirm the updated login password, for example, efgh shown in FIG. 20, by using an account information page 56 of the verification program 50 on the mobile device 30.

It should be noted that, all information transferred between the transmission unit 28 of the computer device 20 and the information transmission unit 36 of the mobile device 30 is encrypted by the first encryption/decryption unit 29 or the second encryption/decryption unit 37, to ensure that the information is perfectly secure during transmission.

It may be understood that the mobile device of the present invention 30 may be bound to multiple user accounts in the computer operating system 25, and one user account in the computer operating system 25 maybe bound to multiple mobile devices 30. The present invention is not limited to a case in which one mobile device 30 can only be bound to one user account.

The login mechanism of the present invention may adapt to an existing login mechanism for a computer operating system. A user only needs to respectively install a verification program and an authentication program of the present invention on a mobile device and a computer device before the mobile device can store a login password for the computer device and perform identity authentication, and an authentication system does not need to be additionally established or login credentials do not need to be additionally made. In this way, information security costs of companies or enterprises can be reduced, and the management convenience of information security departments is improved. Next, in the login mechanism of the present invention, two-factor authentication including login password authentication and biometric feature authentication is used to protect the security of a user account. A person who wants to log in to an account needs to first obtain a mobile device that stores a login password for the account and pass biometric feature authentication of the mobile device to enter and use the account, so that the security of the account is greatly improved. Moreover, the mobile device of the present invention stores a login password for the computer operating system of the computer device, so that the mobile device become an authenticator for the computer operating system. The mobile device only needs to authenticate the biometric feature of the user before the user can log in to a user account in the computer operating system by using the mobile device. In this way, an embarrassing situation in which the user forgets a password and consequently cannot enter the computer operating system to operate the computer device can be avoided. Biometric feature verification may further be used to ensure that a person who wants to perform login is a valid user. Furthermore, the login mechanism of the present invention may automatically generate a login password for the computer operating system, and the new login password may be directly written over a login password in the computer operating system. In this way, not only information security requirements of information security departments of companies or enterprises can be satisfied, but also leakage of information on the computer device that occurs because an original login password is stolen by a malicious person such as a hacker can be avoided, thereby improving the security strength of information.

What is claimed is:

1. A login mechanism for an operating system, comprising:
   a computer device, comprising a processing unit and a transmission unit, the computer device being loaded with a computer operating system; and
   a mobile device, comprising: an operation unit, an information transmission unit, and a sampling unit, the information transmission unit being capable of transmitting a login password, and the sampling unit verifying a human biometric feature, wherein
   when login needs to be performed to the computer operating system, the sampling unit of the mobile device verifies a biometric feature of a user, and after verification succeeds, the information transmission unit transmits the login password to the transmission unit of the computer device, so as to log in to the computer operating system.

2. The login mechanism according to claim 1, wherein the computer operating system of the computer device is protected by a verification password; and the login password is an authentication password, the information transmission unit of the mobile device transmits the authentication password to the transmission unit of the computer device, the computer device compares the verification password with the authentication password, and when the verification password is consistent with the authentication password, login is performed to the computer operating system.

3. The login mechanism according to claim 2, wherein the mobile device further comprises a password generation application, the password generation application is capable of generating a new password, and the new password is used to update the authentication password on the mobile device and is capable of being transmitted to the computer device to update the verification password on the computer device.

4. The login mechanism according to claim 1, wherein the computer device stores a verification password; the mobile device stores an authentication password; and after the user passes biometric feature verification of the sampling unit of the mobile device, the information transmission unit of the mobile device transfers the authentication password to the transmission unit of the computer device, the computer device compares the authentication password with the verification password, and when the authentication password is consistent with the verification password, login is performed to the computer operating system.

5. The login mechanism according to claim 2, wherein the computer device further comprises a first storage unit, and the first storage unit stores the verification password; the mobile device further comprises a second storage unit, and the second storage unit stores the authentication password; and after the user passes biometric feature verification of the sampling unit of the mobile device, the information transmission unit of the mobile device transfers the authentication password to the transmission unit of the computer device, the computer device compares the authentication password with the verification password in the first storage unit, and when the authentication password is consistent with the verification password, login is performed to the computer operating system.

6. The login mechanism according to claim 4, wherein the mobile device stores biometric authentication information; the sampling unit samples the human biometric feature, and generates biometric verification information; and the mobile device compares the biometric verification information with the biometric authentication information, and when the biometric verification information is consistent with the biometric authentication information, the information transmission unit sends the authentication password to the computer device.

7. The login mechanism according to claim 5, wherein the second storage unit of the mobile device stores biometric authentication information; the sampling unit samples the human biometric feature, and generates biometric verification information; and the mobile device compares the biometric verification information with the biometric authentication information, and when the biometric verification information is consistent with the biometric authentication information, the information transmission unit sends the authentication password in the second storage unit to the computer device.

8. The login mechanism according to claim 3, wherein before the password generation application on the mobile device is started, the sampling unit verifies a biometric feature of the user, and if verification succeeds, the password generation application is started.

9. The login mechanism according to claim 3, wherein the transmission unit of the computer device transfers a password generation request to the mobile device, and after the mobile device receives the password generation request and completes biometric feature verification, the password generation application generates the new password.

10. The login mechanism according to claim 8, wherein the transmission unit of the computer device transfers a password generation request to the mobile device, and after the mobile device receives the password generation request and completes biometric feature verification, the password generation application generates the new password.

11. The login mechanism according to claim 1, wherein when login needs to be performed to the computer operating system, the transmission unit of the computer device sends an authentication request to the mobile device; and after the information transmission unit of the mobile device receives the authentication request, the sampling unit verifies the biometric feature of the user.

12. The login mechanism according to claim 2, wherein when login needs to be performed to the computer operating system, the transmission unit of the computer device sends an authentication request to the mobile device; and after the information transmission unit of the mobile device receives the authentication request, the sampling unit verifies the biometric feature of the user.

13. The login mechanism according to claim 1, wherein the computer device further comprises a first encryption/decryption unit, and the first encryption/decryption unit encrypts information transmitted by the transmission unit and decrypts information received by the transmission unit; and the mobile device further comprises a second encryption/decryption unit, and the second encryption/decryption unit encrypts information transmitted by the information transmission unit and decrypts information received by the information transmission unit.

14. The login mechanism according to claim 6, wherein the mobile device is loaded with a mobile operating system, a verification program is installed on the mobile operating system; the verification program on the mobile operating system controls the sampling unit to sample the human biometric feature, enables the operation unit to compare the biometric verification information with the biometric authentication information, and when the biometric verification information is consistent with the biometric authentication information, enables the information transmission unit to transmit the authentication password; and an authentication program is installed on the computer operating system of the computer device, the authentication program enables the transmission unit to receive the authentication password, and enables the processing unit to compare the verification password with the authentication password, and when the verification password is consistent with the authentication password, login is performed to the computer operating system.

15. The login mechanism according to claim 14, wherein the verification program has a control interface, the control interface is displayed on the mobile device.

16. The login mechanism according to claim 14, wherein the verification program has a password generation application, the password generation application is capable of generating a new password, and the new password is used to update the authentication pas sword on the mobile device and is capable of being transmitted to the computer device to update the verification password on the computer device.

17. The login mechanism according to claim 1, wherein the sampling unit of the mobile device samples the human biometric feature.

18. The login mechanism according to claim 17, wherein the sampling unit of the mobile device samples a human face or a human fingerprint.

19. The login mechanism according to claim 1, wherein the transmission unit of the computer device and the information transmission unit of the mobile device transmit information in a Bluetooth communication manner.

* * * * *